United States Patent
Wang et al.

(10) Patent No.: US 9,187,605 B2
(45) Date of Patent: Nov. 17, 2015

(54) PROCESS TO PREPARE POLYESTER PHASE INVERSION LATEXES

(71) Applicant: XEROX CORPORATION, Norwalk, CT (US)

(72) Inventors: Yulin Wang, Oakville (CA); Karen Moffat, Brantford (CA); John L. Pawlak, Rochester, NY (US); Kevin F. Marcell, Webster, NY (US); Steven M. Malachowski, East Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 231 days.

(21) Appl. No.: 13/945,735

(22) Filed: Jul. 18, 2013

(65) Prior Publication Data

US 2015/0025174 A1   Jan. 22, 2015

(51) Int. Cl.
| | |
|---|---|
| *C08J 3/09* | (2006.01) |
| *C08J 3/20* | (2006.01) |
| *C08G 63/42* | (2006.01) |
| *C08K 5/05* | (2006.01) |
| *C08K 5/07* | (2006.01) |
| *G03G 9/093* | (2006.01) |
| *G03G 9/08* | (2006.01) |
| *G03G 9/087* | (2006.01) |

(52) U.S. Cl.
CPC ............... *C08J 3/203* (2013.01); *C08G 63/42* (2013.01); *C08K 5/05* (2013.01); *C08K 5/07* (2013.01); *G03G 9/0804* (2013.01); *G03G 9/08755* (2013.01); *G03G 9/08797* (2013.01); *G03G 9/09392* (2013.01); *C08J 2367/02* (2013.01)

(58) Field of Classification Search
CPC ... G03G 9/0804; G03G 9/09392; C08J 3/203; C08G 63/42; C08K 5/07; C08K 5/05
USPC ......................................................... 523/339
See application file for complete search history.

(56) References Cited

U.S. PATENT DOCUMENTS

| | | | |
|---|---|---|---|
| 6,063,827 | A | 5/2000 | Sacripante et al. |
| 6,593,049 | B1 | 7/2003 | Veregin et al. |
| 6,756,176 | B2 | 6/2004 | Stegamat et al. |
| 6,830,860 | B2 | 12/2004 | Sacripante et al. |
| 8,257,899 | B2 | 9/2012 | Sacripante |
| 2006/0222991 | A1 | 10/2006 | Sacripante et al. |
| 2010/0310979 | A1* | 12/2010 | Ou et al. ............... 430/108.2 |
| 2012/0270149 | A1* | 10/2012 | Mine et al. ............ 430/137.14 |

* cited by examiner

*Primary Examiner* — Hannah Pak
(74) *Attorney, Agent, or Firm* — Pillsbury Winthrop Shaw Pittman LLP

(57) ABSTRACT

A process includes dissolving a polyester resin in an organic solvent to form a solution, the polyester resin has a latex-destabilizing cation, removing substantially all of the latex-destabilizing cation, neutralizing the solution of the polyester resin, adding a sufficient amount of water to the neutralized solution form an emulsion, and removing a portion of the organic solvent from the emulsion to form a latex of the polyester resin.

13 Claims, No Drawings

PROCESS TO PREPARE POLYESTER PHASE INVERSION LATEXES

FIELD

Embodiments disclosed herein relate to processes for the preparation of latexes, and more specifically to processes for the preparation of polyester latexes by phase inversion emulsification.

BACKGROUND

The Phase Inversion Emulsification (PIE) process is a method whereby the phases of a liquid-liquid dispersion interchange such that the dispersed phase spontaneously inverts to become the continuous phase and vice versa under conditions determined by the system properties, volume ratio and energy input.

The phase inversion process typically involves the solubilization of a resin and other components in an organic solvent or mixture of organic solvents that include a phase inversion organic solvent, which is typically chosen for its solubility in both organic and aqueous phases.

By way of example, a solvent-based phase inversion emulsification process is often used to form a polyester resin emulsion in the production of polyester-based toners. In the phase inversion emulsification process, the polyester resin is first dissolved in appropriate organic solvents, such as methyl ethyl ketone and isopropanol, to produce a homogenous organic phase, followed by addition of a fixed amount of base solution, such as ammonium hydroxide, to neutralize acid end carboxyl groups on the polyester chain. The neutralized polymer is subsequently converted to a uniform dispersion of polyester particles, or latex, in water by phase inversion.

SUMMARY OF THE INVENTION

In some aspects, embodiments disclosed herein relate to a process comprising dissolving a polyester resin in an organic solvent to form a solution, wherein the polyester resin has a latex-destabilizing cation, removing substantially all of the latex-destabilizing cation, neutralizing the solution of the polyester resin, adding a sufficient amount of water to the neutralized solution form an emulsion, and removing a portion of the organic solvent from the emulsion to form a latex of the polyester resin.

In some aspects, embodiments disclosed herein relate to a process comprising dissolving a polyester resin in an organic solvent to form a solution, wherein the polyester resin has a latex-destabilizing cation, aging the solution to form an insoluble fraction having the latex-destabilizing cation, removing substantially all of the latex-destabilizing cation by removing the insoluble fraction.

In some aspects, embodiments disclosed herein relate to a process comprising dissolving a polyester resin in an organic solvent to provide a solution, wherein the polyester resin comprises potassium ion, tin ion, or both, removing substantially all of an insoluble fraction of the at least one polyester resin, the insoluble fraction comprising a substantial portion of the potassium ion, tin ion, or both, wherein the insoluble fraction of the at least one polyester resin is formed after a delay period of about 2 hours to about 96 hours following the dissolving step.

DETAILED DESCRIPTION

Embodiments disclosed herein relate to processes for the preparation of polyester latexes by phase inversion emulsification (PIE). When preparing certain polyester resin dispersions/latexes by a standard PIE process it was observed that the process sometimes lacked reproducibility and the resultant latexes often lacked stability. In particular, such polyesters included those made by the so-called carbonate route, such as the polyesters described in U.S. Pat. No. 8,257,899, which is incorporated herein by reference in its entirety. Moreover, even when sufficiently stable latexes were obtained, the downstream aggregation/coalescence to form toner particles was often tainted by dark browning of the mother liquor. This became a significant concern in manufacturing because even after waste water was treated, the intense discoloration was still present, resulting in expensive waste management.

As disclosed herein, it was postulated that the above issues might arise due to the presence of certain residual cations present in the polyester. Without being bound by theory, certain monovalent and divalent cations commonly found in esterification catalysts were particularly suspected as the root cause of the above described problems. Accordingly, in embodiments, there are provided processes for preparing polyester latexes comprising removing latex-destabilizing cations from the polyester to facilitate PIE processing to form polyester latexes. As used herein, "latex-destabilizing cation(s)" generally refers to one or more cations that impair the formation and/or stability of a latex, and/or interferes with and/or causes browning/darkening of the mother liquor during the aggregation/coalescence (A/C) process when forming a latex. For example, a latex-destabilizing cation may cause anomalous particle size and/or distribution of sizes in the latex, and/or cause browning of the mother liquor during the A/C process. Latex-destabilizing cations may completely impair the ability to form a latex at all.

In embodiments, removing latex-destabilizing cations may be accomplished by any means known in the art. Latex-destabilizing cation removal may be accomplished by way of cation exchange with innocuous cation species, certain washes, various chromatographic techniques, including multifunctional chromatography (such as combining size exclusion with specific metal binding ligands), and by use of certain chelating or sequestering agents, or any combination of these techniques. Knowledge of the source of polyester and the exact offending latex-destabilizing cations may be used to tailor a purification procedure to the particular cationic elements that are present. By way of example only, the carbonate route to polyesters, in particular, may result in a polyester contaminated with residual potassium and/or tin ions. Tin has been effectively removed as impurities from organic substrates by way of fluoride washes and/or via chromatographic techniques employing KF-silica as a stationary phase.

In the course of elucidating the impact of latex-destabilizing cations on the PIE process, it was observed that insoluble materials (or grit) were formed when dissolving polyesters in organic solvents. This was particularly the case when the polyesters were prepared by the carbonate route. Such polyester latexes, when sufficiently stable, produced the dark brown mother liquor during the A/C process, as described above. Thus, the presence of insoluble material in polyester solutions appeared to correlate with interference in the resin emulsification process resulting larger particle sizes than desired or causing the formation of highly viscous gel like latexes. Even when a very small amount of insoluble material was present during the phase inversion process, it was generally difficult to prepare a stable emulsion at the target particle size. This observation is atypical in polyester latex formation generally, as small amounts of insoluble materials are frequently present without interference in the PIE process.

Without being bound by theory, it was postulated that the residual insoluble materials from the organic solution of polyesters made by the carbonate route, in particular, may be a source of latex-destabilizing cations. With this realization, it was indicated that mechanical removal of insoluble materials might provide an efficient process solution to the interference of latex-destabilizing cations. As demonstrated in the Examples below, removal of insoluble materials from organic solutions of carbonate route polyesters by filtration or decantation led to stable and reproducible latex dispersions by the standard PIE process. Further, as demonstrated in the Examples, it was confirmed that the composition of the insoluble materials included significant amounts of inorganic $K^+$ and $Sn^{2+}$. Removal of insoluble materials also beneficially reduced the brown color of mother liquor in the A/C process. These and other benefits of embodiments disclosed herein will be apparent to those skilled in the art.

In some embodiments, there are provided processes comprising dissolving a polyester resin in an organic solvent to provide a solution, wherein the polyester resin comprises a latex-destabilizing cation, removing substantially all of the latex-destabilizing cation, neutralizing the solution, adding a sufficient amount of water to the neutralized solution to form an emulsion, and removing a portion of the organic solvent from the emulsion to form a latex of the polyester resin.

The standard PIE process generally comprises four steps. The following exemplary description outlines this process for the emulsification of an amorphous polyester resin into latex:

(1) Dissolution of the resin at a certain temperature in the solvents (generally MEK and IPA);

(2) Neutralization of acid groups by adding an aqueous solution of base to the dissolved resin solution after step (1);

(3) Emulsification by adding preheated or room temperature de-ionized water (DIW) to the above mixture; and (4) Removal of the solvents by a vacuum distillation step.

The mechanisms governing the dissolution step may be quite complex in the case of dissolving polymer resins, but over time most polymers eventually can be dissolved. In accordance with embodiments disclosed herein, polyesters comprising latex-destabilizing cations may result in the presence of insoluble materials at this dissolution step, especially after an aging period. As demonstrated in the Examples below, where the latex-destabilizing cations reside in any insoluble material, the efficient manufacturing step of filtration or decantation may be sufficient to carry out the remaining portion of the PIE process. In other embodiments, latex-destabilizing cations may be present after a dissolution step, but insoluble material may be absent. In some such embodiments, other standard cation removal techniques may be employed for cation removal as described above.

In embodiments, the polyester resins for PIE processing may be amorphous, including those prepared by the carbonate route. In other embodiments, the polyester resin may be crystalline. Any resin may be utilized in forming a latex emulsion of the present disclosure. In embodiments, the resins may be amorphous, crystalline, and/or a combination thereof. In embodiments, the resin may be a crystalline polyester resin with acidic groups having an acid number of about 1 mg KOH/g polymer to about 200 mg KOH/g polymer, in embodiments from about 5 mg KOH/g polymer to about 50 mg KOH/g polymer. In further embodiments, the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reaction of a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like including their structural isomers. The aliphatic diol may be, for example, selected in an amount of from about 40 to about 60 mole percent, in embodiments from about 42 to about 55 mole percent, in embodiments from about 45 to about 53 mole percent, and a second diol can be selected in an amount of from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, in embodiments from about 40 to about 60 mole percent, in embodiments from about 42 to about 52 mole percent, in embodiments from about 45 to about 50 mole percent, and a second diacid can be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 1 to about 85 percent by weight of the toner components, in embodiments from about 5 to about 50 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 3 to about 4.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl)oxide, dipropylene glycol, dibutylene, and combinations thereof. The amount of organic diols selected can vary, and may be present, for example, in an amount from about 40 to about 60 mole percent of the resin, in embodiments from about 42 to about 55 mole percent of the resin, in embodiments from about 45 to about 53 mole percent of the resin.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin. Any of the foregoing catalysts may be present residually in the resultant polyester and may be a source of latex-destabilizing cations.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly (propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly (propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly (propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be an amorphous polyester such as a poly(propoxylated bisphenol A co-fumarate) resin having the following formula (I):

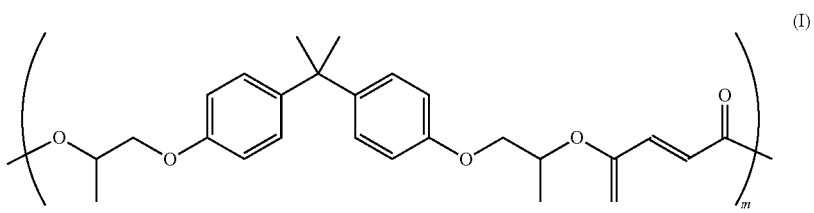

(I)

wherein m may be from about 5 to about 1000. Examples of such resins and processes for their production include those disclosed in U.S. Pat. No. 6,063,827, the disclosure of which is hereby incorporated by reference in its entirety.

An example of a linear propoxylated bisphenol A fumarate resin which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

Suitable crystalline resins which may be utilized, optionally in combination with an amorphous resin as described above, include those disclosed in U.S. Patent Application Publication No. 2006/0222991, the disclosure of which is hereby incorporated by reference in its entirety. In embodiments, a suitable crystalline resin may include a resin formed of ethylene glycol and a mixture of dodecanedioic acid and fumaric acid co-monomers with the following formula:

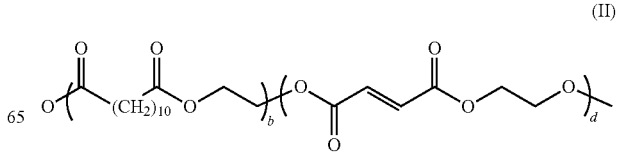

(II)

wherein b is from about 5 to about 2000 and d is from about 5 to about 2000.

For example, in embodiments, a poly(propoxylated bisphenol A co-fumarate) resin of formula I as described above may be combined with a crystalline resin of formula II to form a latex emulsion.

An amorphous resin may be present, for example, in an amount of from about 5 to about 95 percent by weight of the toner components, in embodiments from about 30 to about 80 percent by weight of the toner components. In embodiments, the amorphous resin or combination of amorphous resins utilized in the latex may have a glass transition temperature of from about 30° C. to about 80° C., in embodiments from about 35° C. to about 70° C. In further embodiments, the combined resins utilized in the latex may have a melt viscosity of from about 10 to about 1,000,000 Pa*S at about 130° C., in embodiments from about 50 to about 100,000 Pa*S.

One, two, or more resins may be used. In embodiments, where two or more resins are used, the resins may be in any suitable ratio (e.g., weight ratio) such as for instance of from about 1% (first resin)/99% (second resin) to about 99% (first resin)/1% (second resin), in embodiments from about 10% (first resin)/90% (second resin) to about 90% (first resin)/10% (second resin).

In embodiments the resin may possess acid groups which, in embodiments, may be present at the terminal of the resin. Acid groups which may be present include carboxylic acid groups, and the like. The number of carboxylic acid groups may be controlled by adjusting the materials utilized to form the resin and reaction conditions.

In embodiments, the amorphous resin may be a polyester resin having an acid number from about 2 mg KOH/g of resin to about 200 mg KOH/g of resin, in embodiments from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

In embodiments, processes disclosed herein may comprise an organic solvent such as methylethylketone (MEK), isopropanol, or combinations thereof to dissolve the polyester resin. In some embodiments, processes disclosed herein may employ an organic solvent selected from the group consisting of isopropanol, methyl ethyl ketone, methanol, ethanol, 1-butanol, 2-butanol, isobutanol, tert-butanol, and combinations thereof. In particular embodiments, pairs of organic solvents may be employed, at least one of which may have appreciable miscibility in water. Any suitable organic solvent may be used to dissolve the polyester resin, for example, alcohols, esters, ethers, ketones, amines, and combinations thereof, in an amount of, for example, from about 0.1% by weight to about 100% by weight of the resin, or from about 2% by weight to about 50% by weight of the resin, or from about 5% by weight to about 35% by weight of the resin. In embodiments, the solvent to resin ratio may be about 0.1:10 to about 20:10, or from about 1.0:10 to about 5:10.

In embodiments, suitable organic solvents, sometimes referred to as phase inversion agents, include, for example, methanol, ethanol, propanol, isopropanol, 1-butanol, 2-butanol, tert-butanol, ethyl acetate, methyl ethyl ketone, and combinations thereof. In embodiments, the organic solvent may be isopropanol. In embodiments, the organic solvent may be immiscible in water and may have a boiling point of from about 30° C. to about 150° C.

In some embodiments, processes disclosed herein may employ a neutralizing agent independently selected from the group consisting of ammonium hydroxide, potassium hydroxide, sodium hydroxide, sodium carbonate, sodium bicarbonate, lithium hydroxide, potassium carbonate, organoamines, and combinations thereof.

In embodiments, the polyester resin may be mixed with a weak base or neutralizing agent. In embodiments, the neutralizing agent may be used to neutralize acid groups in the resins, so a neutralizing agent herein may also be referred to as a "basic neutralization agent." Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof, and the like. Suitable basic neutralizing agents may also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. In embodiments, the monocyclic and polycyclic compounds may be unsubstituted or substituted at any carbon position on the ring.

The basic neutralizing agent may be utilized in an amount of from about 0.001% by weight to 50% by weight of the polyester resin, or from about 0.01% by weight to about 25% by weight of the resin, or from about 0.1% by weight to 5% by weight of the resin. In embodiments, the neutralizing agent may be added in the form of an aqueous solution. In other embodiments, the neutralizing agent may be added in the form of a solid.

Utilizing the above basic neutralizing agent in combination with a resin possessing acid groups, a neutralization ratio of from about 25% to about 500% may be achieved, in embodiments from about 50% to about 300%. In embodiments, the neutralization ratio may be calculated as the molar ratio of basic groups provided with the basic neutralizing agent to the acid groups present in the resin multiplied by 100%.

As noted above, the basic neutralization agent may be added to a resin possessing acid groups. The addition of the basic neutralization agent may thus raise the pH of an emulsion including a resin possessing acid groups from about 5 to about 12, or from about 6 to about 11. The neutralization of the acid groups may, in embodiments, enhance formation of the emulsion.

In embodiments, the process of the present disclosure may optionally include adding a surfactant, before or during the dissolution, of the polyester resin. In embodiments, the surfactant may be added prior to dissolution of the polyester resin at an elevated temperature. Where utilized, a resin emulsion may include one, two, or more surfactants. The surfactants may be selected from ionic surfactants and nonionic surfactants. Anionic surfactants and cationic surfactants are encompassed by the term "ionic surfactants." In embodiments, the surfactant may be added as a solid or as a solution with a concentration of from about 5% to about 100% (pure surfactant) by weight, in embodiments, from about 10% to about 95% by weight. In embodiments, the surfactant may be utilized so that it is present in an amount of from about 0.01% to about 20% by weight of the resin, in embodiments, from about 0.1% to about 16% by weight of the resin, in other embodiments, from about 1% to about 14% by weight of the resin.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™™ 2A1, an alkyldiphenyloxide disulfonate from The Dow Chemical Company, and/or TAYCA POWER BN2060 from Tayca Corporation (Japan), which are branched sodium dodecylbenzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly (ethyleneoxy)ethanol, available from Rhone-Poulenc as IGEPAL CA-210™, IGEPAL CA-520™, IGEPAL CA-720™, IGEPAL CO890™, IGEPAL CO720™, IGEPAL CO290™, IGEPAL CA-210™, ANTAROX 890™ and ANTAROX 897™. Other examples of suitable nonionic surfactants may include a block copolymer of polyethylene oxide and polypropylene oxide, including those commercially available as SYNPERONIC PE/F, in embodiments SYNPERONIC PE/F 108. Combinations of these surfactants and any of the foregoing surfactants may be utilized in embodiments.

As noted above, the present process may employ more than one polyester resin. In some such embodiments, the resins may be all pre-blended together prior to processing. In some embodiments, one of a mixture resins may be a crystalline resin and elevated temperatures may be employed in the process which may be a temperature above the crystallization temperature of the crystalline resin. In further embodiments, the resin may be a mixture of amorphous and crystalline resins and the temperature employed for dissolution may be above the glass transition temperature of the mixture. In other embodiments, each of a serious of polyester resins may be processed into latexes separately and then the individually prepared latexes may be combined.

In some embodiments emulsifying neutralized polyester resins may comprise adding water dropwise into the solution of neutralized resin until phase inversion occurs to form a phase inversed latex emulsion. Emulsification may be followed by distilling the latex to remove from it organic solvent, water or a mixture of the two.

In embodiments, the neutralizing agent which may be utilized in the process of the present disclosure includes the agents mentioned hereinabove. In embodiments, an optional surfactant employed in the process may be any of the surfactants to ensure that proper resin neutralization occurs and leads to a high quality latex with low coarse content.

In embodiments, the surfactant may be added to the one or more ingredients of the resin composition before, during, or after any mixing. In embodiments, the surfactant may be added before, during, or after the addition of the neutralizing agent. In embodiments, the surfactant may be added prior to the addition of the neutralizing agent. In embodiments, a surfactant may be added to a pre-blend mixture prior to dissolution.

In embodiments, a continuous phase inversed emulsion may be formed. Phase inversion can be accomplished by continuing to add an aqueous alkaline solution or basic agent, optional surfactant and/or water compositions to create a phase inversed emulsion which includes a disperse phase including droplets possessing the molten ingredients of the resin composition, and a continuous phase including a surfactant and/or water composition.

Stirring, although not necessary, may be utilized to enhance formation of the latex. Any suitable stirring device may be utilized. In embodiments, the stirring may be at a speed of from about 10 revolutions per minute (rpm) to about 5,000 rpm, in embodiments from about 20 rpm to about 2,000 rpm, in other embodiments from about 50 rpm to about 1,000 rpm. The stirring need not be at a constant speed, but may be varied. For example, as the mixture becomes more uniform, the stirring rate may be increased. In embodiments, a homogenizer (that is, a high shear device), may be utilized to form the phase inversed emulsion, but in other embodiments, the process of the present disclosure may take place without the use of a homogenizer. Where utilized, a homogenizer may operate at a rate of from about 3,000 rpm to about 10,000 rpm.

Although the point of phase inversion may vary depending on the components of the emulsion, any temperature of heating, the stirring speed, and the like, phase inversion may occur when the basic neutralization agent, optional surfactant, and/or water has been added so that the resulting resin is present in an amount from about 5% by weight to about 70% by weight of the emulsion, or from about 20% by weight to about 65% by weight of the emulsion, or from about 30% by weight to about 60% by weight of the emulsion.

Following phase inversion, additional surfactant, water, and/or aqueous alkaline solution may optionally be added to dilute the phase inversed emulsion, although this is not required. Following phase inversion, the phase inversed emulsion may be cooled to room temperature if heat was employed, for example from about 20° C. to about 25° C.

In embodiments, distillation may be performed to provide resin emulsion particles as a latex with an average diameter size of, for example, from about 50 nm to about 500 nm, in embodiments from about 120 nm to about 250 nm. In some embodiments, the distillate may be optionally recycled for use in a subsequent phase inversion emulsification process.

In embodiments, for example, the distillate from the process of the present disclosure may contain isopropanol (IPA) and water. In embodiments, the IPA-water mixture separation may be enhanced by a process called salt effect distillation. In this process, a salt (such as, for example, sodium chloride) may be added to extract water out of the organic phase and into the aqueous phase thus decreasing the equilibrium solubility of water in the organic phase. In some embodiments, solvents may be removed by a vacuum distillation.

The emulsified polyester resin particles in the aqueous medium may have a submicron size, for example of about 1 μm or less, in embodiments about 500 nm or less, such as from about 10 nm to about 500 nm, or from about 50 nm to about 400 nm, or from about 100 nm to about 300 nm, or about 200 nm. Adjustments in particle size can be made by modifying the ratio of water to resin, the neutralization ratio, solvent concentration, and solvent composition. Particle size distribution of a latex of the present disclosure may be from about 30 nm to about 500 nm, or from about 125 nm to about 400 nm.

The coarse content of the latex of the present disclosure may be from about 0.01% by weight to about 5% by weight, in embodiments, from about 0.1% by weight to about 3% by weight. The solids content of the latex of the present disclosure may be from about 10% by weight to about 50% by weight, in embodiments, from about 20% by weight to about 40% by weight.

The emulsions of the present disclosure may then be utilized to produce particles that are suitable for formation of toner particles provided that latex-destabilizing cations have been substantially removed. In embodiments, the latex-destabilizing cation comprises a monovalent cation, a divalent cation, or combinations thereof. In embodiments, the monovalent cation is selected from lithium, potassium, sodium, or combinations thereof, i.e., $Li^{+1}$, $K^{+1}$, or $Na^{+1}$, alone or in any combination. In embodiments, the divalent cation is selected from tin, iron, copper, calcium, magnesium, and zinc ions. In embodiments, the latex-destabilizing cation comprises a mixture of potassium and tin ions. In embodiments, the latex-destabilizing cation may be present in an insoluble fraction of the at least one polyester resin. In other embodiments, the latex-destabilizing cation may be present in a soluble form. In some such embodiments, removing the latex-destabilizing cations may be accomplished by way of cation exchange chromatography, washing with a reagent such as EDTA capable of sequestering and/or chelating the ion, or any other technique known in the art for cation removal. In some embodiments, latex-destabilizing cation removal may be accomplished chromatographically with immobilized chelating agents, such as immobilized crown ethers. In some embodiments, further purification may be accomplished chromatographically by size exclusion chromatography. In some embodiments, latex-destabilizing cations may be removed by oxidation, flocculation, or combinations thereof.

In embodiments, during dissolution, when an insoluble fraction forms it may be beneficial to incorporate a delay period following the dissolving step. It has been observed, for example, when dissolving carbonate route polyesters, in particular, the complete formation of insoluble material containing latex-destabilizing cations may not be complete upon apparent dissolution and an aging period to allow complete solids formation is useful for downstream PIE processing. In embodiments, the delay (or aging) period may be in a range from about 2 hours to about 72 hours. In some embodiments, removing substantially all of the latex-destabilizing cation comprises removing substantially the insoluble material by filtration, decantation, centrifugation, or combinations thereof after the delay period.

In some embodiments, there are provided processes comprising dissolving at least one polyester resin in an organic solvent to provide a solution of the at least one polyester resin, wherein the at least one polyester resin comprises potassium ion, tin ion, or both, removing substantially all of an insoluble fraction of the at least one polyester resin, the insoluble fraction comprising a substantial portion of the potassium ion, tin ion, or both, wherein the insoluble fraction of the at least one polyester resin is formed after a delay period of about 2 hours to about 96 hours following the dissolving step. In some such embodiments, the substantial portion comprises about 8%-35% of the potassium ion, tin ion, or both. In other such embodiments, the substantial portion comprises about 10%-50% of the potassium ion, tin ion, or both. Once the polyester resins disclosed herein have been converted into a latex they may be utilized to form a toner by any process within the purview of those skilled in the art. The latex may be contacted with a colorant, optionally in a dispersion, and other additives to form an ultra low melt toner by a suitable process, in embodiments, an emulsion aggregation and coalescence process.

In embodiments, the optional additional ingredients of a toner composition including colorant, wax, and other additives, may be added before, during or after mixing the polyester resin to form the emulsion. The additional ingredients may be added before, during or after formation of the latex emulsion. In further embodiments, the colorant may be added before the addition of the surfactant.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

This Example shows characterization of the insoluble materials generated when dissolving carbonate route polyesters in organic solvent.

In the Examples below, various polyester resins were prepared by the carbonate route in procedures analogous to those disclosed in U.S. Pat. No. 8,257,899. The amount of insoluble material produced upon dissolution of the polyesters in organic solvent (methylethyl ketone (MEK) and isopropanol (IPA)) and the quantification of elemental tin in the material is shown in Table 1. The weight percent of insoluble material derived from the polyester resin that does not dissolve in solvent varied from about 0.5 to about 1 weight percent which can be substantial in a large scale emulsification.

TABLE 1

| Resin ID | Insoluble material (g) in 20 g resin | Insoluble material (%) | Sn level of resin (ppm) |
|---|---|---|---|
| 1 | 0.187 | 0.94 | 1708 |
| 2 | 0.217 | 1.08 | 1708 |
| 3 | 0.1 | 0.5 | 1039 |
| 4 | 0.132 | 0.66 | 1378 |
| 5 | 0.104 | 0.52 | 458 |
| 6 | 0.112 | 0.56 | 458 |
| 7 | 0.181 | 0.91 | 2755 |

Inductively coupled plasma mass spectrometry (ICP-MS) analysis obtained on various samples of insoluble material indicated high levels of potassium and tin as shown in Table 2.

TABLE 2

| Resin ID | ICP (ppm) | | | | |
|---|---|---|---|---|---|
| | Al | K | Na | Sn | Zn |
| 1 | 26.85 | 68600 | 4565 | 290200 | 56.34 |
| 2 | / | 114000 | 3900 | 219000 | 1790 |
| 3 | / | 87300 | 3510 | 187000 | 1870 |
| 4 | 2048 | 76910 | 4407 | 219300 | 83.28 |
| 5 | 156.8 | 134300 | 2660 | 106500 | 142.8 |
| 6 | 931.3 | 26540 | 1816 | 91260 | 181.4 |
| 7 | 1.72 | 46720 | 4136 | 228100 | 41.59 |
| 8 | / | 92300 | 3690 | 166000 | / |
| 9 | / | 152000 | 2450 | 98300 | 1680 |

The elemental analysis of various carbonate route polyester resins samples shown in Table 3 also correlate well with the catalyst loading in the polyester synthesis.

TABLE 3

| Resin ID | Al (ppm) | Na (ppm) | Fe (ppm) | Cu (ppm) | Sn (ppm) | Si (ppm) | Ca (ppm) | Mg (ppm) | K (ppm) | Ti (ppm) | Zn (ppm) |
|---|---|---|---|---|---|---|---|---|---|---|---|
| 1 | 2 | 29 | 2 | 7 | 1494 | 3 | 2 | 0 | 26 | 1 | |
| 2 | 1 | 29 | 3 | 13 | 1606 | 2 | 3 | 1 | 240 | 1 | |
| 3 | 0.19 | 23.51 | 1.3 | 2.22 | 1108 | 4.57 | 6.26 | 0.88 | 237.9 | 1.08 | 0.388 |
| 6 | 29 | 16 | 3 | | 407 | 3 | 2 | 1 | 57 | 0.3 | |
| 7 | 3.7 | 35.6 | 2 | 17 | 2016 | 12 | 3.38 | 0.83 | 353 | 0.24 | |
| 8 | 4.07 | 20 | 1.25 | 1.74 | 1025 | 15.5 | 2.82 | 0.5 | 192.2 | 0.45 | |
| 9 | 11.52 | 1.01 | 1.28 | 3.61 | 392.2 | 368 | 1.81 | 0.54 | 368.9 | 0.42 | |

Matrix-assisted laser desorption/ionization-time of flight (MALDI-TOF) analysis of the insoluble material also indicated that it contained short chain oligomeric species related to the main polyester resin composition, including, for example, the presence of terephthalic acid capped propoxylated BPA and some fumaric acid with the acid ends coordinated to excessive levels of potassium and tin.

Four insoluble material samples from the polyester samples were extracted and base-hydrolyzed to their monomer components and analyzed by LC/UV to estimate the monomer and oligomer content. The samples contained high concentration of fumarate or terephthalate salts as shown in Table 4.

TABLE 4

| Resin ID | Adipic Acid (ug/g) [Di & Tri Acids IC] | Fumaric Acid (ug/g) [Di & Tri Acids IC] | Terephthalic Acid (ug/g) [Di & Tri Acids IC] | Isophthalic acid (ug/g) [Di & Tri Acids IC] | Trimellitic acid (ug/g) [Di & Tri Acids IC] |
|---|---|---|---|---|---|
| 2 | <5 | 225 | 7.4 | <5 | <5 |
| 3 | <5 | 28 | 7.4 | <5 | <5 |
| 8 | <5 | 180 | 5.9 | <5 | <5 |
| 9 | <5 | 365 | 5.9 | <5 | <5 |

Example 2

This Example shows the effect of the presence of the insoluble material on the PIE process for select resins from Example 1.

Three of the resins from Example 1 with different Sn levels and different acid values were chosen to prepare latex by phase inversion emulsification (PIE) process. Small scale PIE experiments (small quantities of latex) were conducted to first obtain a suitable neutralization ratio (NR) for each resin. Three resins could not be emulsified to produce a latex with the desired particle size. The latexes produced were either out of specification for size or a highly viscous gel-like material was generated. The results are shown in Table 5.

TABLE 5

| ID of Resin | Sn level (input) (ppm) | Acid Value (mg KOH/g resin) | NR (from small scale PIE) | Particle size (nm) (from small scale PIE) | NR used in bench scale PIE | The emulsification result bench scale PIE |
|---|---|---|---|---|---|---|
| 8 | 1378 | 11.05 | 58-118% | 89.4-150.3 | 118% | P.S 334 nm |
| 9 | 458 | 6.1 | 84-278% | 185-238 | 182%. 201% | Sticky paste |

TABLE 5-continued

| ID of Resin | Sn level (input) (ppm) | Acid Value (mg KOH/g resin) | NR (from small scale PIE) | Particle size (nm) (from small scale PIE) | NR used in bench scale PIE | The emulsification result bench scale PIE |
|---|---|---|---|---|---|---|
| 10 | 1378 | 4.88 | 109-420% | 108.7-146.9 | 175%. 232%. 224% | Sticky gel like material like material |

Table 5 shows that even with varying neutralization ratio and dispersion conditions, stable latexes with the desired properties could not be achieved. Once the insoluble materials were removed (filtration or decantation), stable latexes with the desired particle size could be produced as indicated in the results shown in Table 6.

TABLE 6

| Latex ID | Resin ID | NR (bench scale PIE) | Particle size (nm) |
|---|---|---|---|
| 1 | 8 | 58% | 167.6 |
| 2 | 8 | 58% | 171.1 |
| 3 | 9 | 84% | 177 |
| 4 | 9 | 85% | 174 |
| 5 | 10 | 226% | 109.9 |

Good particle size control was demonstrated and a reproducible process was achieved for the Examples shown in Table 6. This confirmed the hypothesis that insoluble material does interfere with the resin emulsification process, indicating the negative impact of tin and potassium, in particular as latex-destabilizing cations.

When carbonate route polyester resin dispersion that contained some insoluble material was used to prepare toner particles, the resulting A/C process mother liquor had an intense dark brown color compared to a control polyester made by a route lacking potential latex-destabilizing cations as a control.

Experiments were also conducted where the insoluble material on it own was subjected to the aggregation/coalescence process. The purpose for this experiment was to determine if the water soluble components (acid, base, EDTA) may have any impact on producing the intense brown colour and at what stage during the A/C process the color appears. The experiment indicated that the insoluble material became very soluble at elevated temperature (greater than about 55° C.) in the presence of EDTA (Versene)/NaOH solution which produced the brown mother liquor color, even in the absence of toner particle components. The supernatant produced from the A/C process was a light brown.

Without being bound by theory, it was postulated that EDTA has a higher chelating affinity for tin over aluminum. The water insoluble material in the presence of EDTA at elevated temperature becomes solubilized and produces the colored supernatant during the coalescence process. The color formed early in coalescence, just after the particle growth freezing step and when the temperature was being ramped up and continued throughout a series of samples taken over time.

The stability constants for EDTA chelation with different cations indicates EDTA has a higher affinity for tin over aluminum. Stability constants ($K_{MY}$) for EDTA with cations present in the EA process are Na=45.7, Al=$1.3 \times 10^{16}$ and Sn=$2.0 \times 10^{18}$. Thus, EDTA has an affinity to complex with Sn over Al by about two orders of magnitude and this complexation is temperature sensitive. The EA samples taken throughout the A/C process indicate that after the particle freezing step when EDTA and NaOH are added and the temperature is increased at the start of coalescence, the temperature only needs to reach about 58° C. and the brown mother color was produced. As a consequence of understanding the root cause of the brown mother color, the removal of the insoluble material during the emulsification process provides two benefits: 1) it reduces the brown mother liquor color and 2) provides a more robust resin emulsification process. The insoluble material can be removed by either decantation or filtration prior to phase inversion emulsification. By removing the insoluble material there is a decreased availability of tin in the material to complex with EDTA and form a water soluble latex-destabilizing cation component.

Comparative Latex Example

Preparation of a control polyester resin dispersion (control) known to lack latex-destabilizing cations. Into a vessel was added 100 grams of an amorphous polyester resin to a mixed solvent solution of 100 grams of methylethyl ketone (MEK) and 6 grams of isopropylalcohol (IPA). The mixture was stirred in a 60° C. water bath to dissolve the resin. Subsequently, 1.75 grams of previously prepared 10% ammonium hydroxide solution was added into the resin solution which cooled the solution down to room temperature while mixing by shaking. Emulsification of the neutralized resin solution was conducted by adding 187.2 grams of de-ionized water slowly. The resulting phase inversion latex had an average particle size 118.1 nm as measured using a Nanotrac particle size analyzer.

Latex Example Set 1

Emulsion of a carbonate route polyester resin dispersion with removal of insoluble material. Into a vessel was added 50 grams of a carbonate route amorphous polyester resin to a mixed solvent solution consisting of 50 grams of methylethyl ketone (MEK) and 5 grams of isopropylalcohol (IPA). The mixture was stirred in a 60° C. water bath to dissolve the resin. The same resin solution preparation process was implemented for two different batches of other carbonate route polyester resins each employing 50 g of carbonate route polyester resin. The solutions were left to stand for 12 hours to settle any insoluble material and then the soluble resin solutions containing each resin were transferred into clean 500 mL plastic bottles followed by addition of 10% ammonium hydroxide where the amount was determined by with the neutralization ratio as listed in Table 6 for each resin. Each solution was mixed completely and emulsified by adding deionized water (DIW) slowly while shaking by hand. The particle size was measured and found to be within the desired particle size ranging from 109.9 to 177 nm as show in Table 6. Resins were emulsified twice to produce two different latex batches for each resin to demonstrate reproducibility.

Latex Example Set 2

Emulsion preparation for carbonate route polyester resin solution containing insoluble material. In a vessel was added 50 grams of a carbonate route amorphous polyester resin to a mixed solvent solution consisting of 50 grams of MEK and 5 grams of IPA. The mixture was stirred in a 60° C. water bath to dissolve the resin. The same resin solution preparation process was also implemented for two additional carbonate route polyester resin batches. No separation of insoluble material was performed. To the resin solutions was added 10% ammonium hydroxide solution and the amount was determined by the neutralization ratio as listed in Table 5 for each resin. Each solution was mixed thoroughly and emulsified by adding deionized water slowly while shaking the solution by hand. The particle size was measured and found to be extremely variable and outside the desired particle size specification range. The values ranged from 89 nm to 238 nm for the three different batches of resin as shown in Table 5. Five out of six latexes resulted in highly viscous gel-like materials that were not stable latexes as shown in Table 5. This provides evidence of the consequence of not removing the insoluble material prior to the emulsification process.

Example 3

Toner Particles Preparation

Comparative Toner Particle Example

Toner A/C process. Into a 2 liter glass reactor equipped with an overhead mixer was added 98.88 g low molecular weight amorphous non-carbonate route polyester resin emulsion (35.91 wt %), 102.84 g high molecular weight amorphous non-carbonate route polyester resin emulsion (35.22 wt %), 27.47 g crystalline non-carbonate route polyester resin emulsion (35.36 wt %), 42.78 g IGI wax dispersion (30.19 wt %) and 50.53 g cyan pigment PB15:3 (16.61 wt %). Separately 2.51 g $Al_2(SO_4)_3$ (27.85 wt %) was added in as flocculent under homogenization. The mixture was heated to 40° C. to aggregate the particles while stirring at rpm 200 rpm. The particle size was monitored with a Coulter Counter until the core particles reached a volume average particle size of about 4.49 microns with a grain size distribution (GSD) volume of 1.21, GSD number of 1.26, and then a mixture of 54.61 g and 56.79 g of above mentioned polyester resin emulsions were added as shell material, resulting in a core-shell structured particles with an average particle size of 5.77 microns, GSD volume 1.18, GSD number 1.20. Thereafter, the pH of the reaction slurry was then increased to 4.2 using 4 wt % NaOH solution followed by 5.38 g of Versene to freeze the toner particle growth. After freezing, the reaction mixture was heated to 85° C. while maintaining pH greater than 7.8. Toner particles had an average particle size of 5.95 microns, GSD volume 1.20, GSD number 1.22. After maintaining the reaction temperature at 85° C. for about 10 min, pH was reduced to 7.2 stepwise over 80 minutes using pH 5.7 acetic acid/sodium acetate (AcOH/NaOAc) buffer solution for coalescence. The toner was quenched after coalescence, resulting in a final particle size of 6.02 microns, GSD volume of 1.21, GSD number of 1.27. The toner slurry was then cooled to room temperature, separated by sieving (25 mm), filtration, followed by washing and freeze dried. The circularity of final particle is 0.957. The color of the mother liquor solution was slightly cyan in colour due to free pigment not fully encompassed in the toner particles.

Toner Particle Example 1

Toner particles from carbonate route polyester latex including insoluble material. Into a 2 liter glass reactor equipped with an overhead mixer was added 80.86 g low molecular weight amorphous carbonate route polyester resin emulsion (43.9 wt %), 102.81 g high molecular weight non-carbonate route polyester amorphous resin emulsion (35.22 wt %), 27.21 g crystalline non-carbonate route polyester resin emulsion (35.6 wt %), 42.78 g IGI wax dispersion (30.19 wt %) and 48.18 g cyan pigment PB15:3 (17.42 wt %). Separately 2.51 g $Al_2(SO_4)_3$ (27.85 wt %) was added in as a flocculent under homogenization. The mixture was heated to 40° C. to aggregate the particles while stirring at rpm 200 rpm. The particle size was monitored with a Coulter Counter until the core particles reached a volume average particle size of about 4.53 microns with a GSD volume of 1.23, GSD number of 1.31, and then a mixture of 44.64 g and 56.76 g of above mentioned carbonate and non-carbonate route resin emulsions were added as shell material, resulting in core-shell structured particles with an average particle size of 5.03 microns, GSD volume 1.20, GSD number 1.23. Thereafter, the pH of the reaction slurry was then increased to 4.6 using 4 wt % NaOH solution followed by 5.38 g of Versene to freeze the toner particle growth. After freezing, the reaction mixture was heated to 85° C. while maintaining pH greater than 7.8. Toner particles have average particle size of 6.34 microns, GSD volume 1.22, GSD number 1.32. After maintaining the reaction temperature at 85° C. for about 10 min, pH was reduced to 7.2 stepwise over 80 minutes using pH 5.7 acetic acid/sodium acetate (AcOH/NaOAc) buffer solution for coalescence. The toner was quenched after coalescence, resulting in a final particle size of 6.89 microns, GSD volume of 1.25, GSD number of 1.32. Both GSDv and GSDn were too wide and out of specification for this toner design. The toner slurry was then cooled to room temperature, separated by sieving (25 mm), filtration, followed by washing and freeze dried. The color of mother liquor solution was a clear but a very dark brown.

Toner Particle Example 2

Toner particles from carbonate route polyester latex with insoluble material removed. Into a 2 liter glass reactor equipped with an overhead mixer was added 79.91 g low molecular weight amorphous carbonate route polyester resin emulsion (45.32 wt %), 102.84 g high molecular weight amorphous non-carbonate route polyester resin emulsion (35.22 wt %), 27.47 g crystalline non-carbonate route polyester resin emulsion (35.36 wt %), 42.78 g IGI wax dispersion (30.19 wt %) and 50.53 g cyan pigment PB15:3 (16.61 wt %). Separately 2.51 g $Al_2(SO_4)_3$ (27.85 wt %) was added in as flocculent under homogenization. The mixture was heated to 40° C. to aggregate the particles while stirring at rpm 200 rpm. The particle size was monitored with a Coulter Counter until the core particles reached a volume average particle size of 4.39 microns with a GSD volume of 1.22, GSD number of 1.27, and then a mixture of 44.14 g and 56.79 g of above mentioned carbonate and non-carbonate resin emulsions were added as shell material, resulting in core-shell structured particles with an average particle size of 4.78 microns, GSD volume 1.22, GSD number 1.32. Thereafter, the pH of the reaction slurry was then increased to 4.2 using 4 wt % NaOH solution followed by 5.38 g of Versene to freeze the toner particle growth. After freezing, the reaction mixture was heated to 85° C. while maintaining pH greater than 7.8. Toner particles have average particle size of 5.83 microns, GSD volume 1.20, GSD number 1.25. After maintaining the reaction temperature at 85° C. for about 10 min, pH was reduced to 7.2 stepwise over 80 minutes using pH 5.7 acetic acid/sodium acetate (AcOH/NaOAc) buffer solution for coalescence. The toner was quenched after coalescence, resulting in a final particle size of 6.08 microns, GSD volume of 1.23, GSD number of 1.32. The toner slurry was then cooled to room temperature, separated by sieving (25 mm), filtration, followed by washing and freeze dried. The circularity of final particle is 0.954. The color of the mother liquor showed a significantly reduced color after removing the insoluble material during the resin emulsification process.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A process for preparation of latex comprising:
   dissolving a polyester resin in an organic solvent to form a solution, wherein the polyester resin has a latex-destabilizing cation and the latex-destabilizing cation is present in an insoluble fraction of the solution, and further wherein the insoluble fraction forms after a delay period of about 2 hours to about 96 hours following the dissolving step;
   removing the latex-destabilizing cation, wherein removing the latex-destabilizing cation comprises filtration, decantation, centrifugation, or combinations thereof after the delay period;
   neutralizing the solution of the polyester resin;
   adding a sufficient amount of water to the neutralized solution to form an emulsion; and
   removing a portion of the organic solvent from the emulsion to form a latex of the polyester resin.

2. The process of claim 1, wherein the polyester resin is amorphous.

3. The process of claim 1, wherein the polyester resin is crystalline.

4. The process of claim 1, wherein the organic solvent comprises methylethylketone (MEK), isopropanol, or combinations thereof.

5. The process of claim 1, wherein the latex-destabilizing cation comprises a monovalent cation, a divalent cation, or combinations thereof.

6. The process of claim 5, wherein the monovalent cation is selected from the group consisting of lithium ion, potassium ion, sodium ion, and combinations thereof.

7. The process of claim 5, wherein the divalent cation is selected from the group consisting of tin, iron, copper, calcium, magnesium, and zinc ions.

8. The process of claim 1, wherein the latex-destabilizing cation comprises a mixture of potassium and tin ions.

9. A process for preparation of latex comprising:
dissolving a polyester resin in an organic solvent to form a solution, wherein the polyester resin has a latex-destabilizing cation;
aging the solution form an insoluble fraction having the latex-destabilizing cation and further wherein the insoluble fraction forms after a delay period of about 2 hours to about 96 hours following the dissolving step;
removing the latex-destabilizing cation by removing the insoluble fraction, wherein removing the latex-destabilizing cation comprises filtration, decantation, centrifugation, or combinations thereof after the delay period;
and forming a latex of the at least one polyester resin after the removing step.

10. The process of claim 9, wherein the latex-destabilizing cation comprises potassium, tin, or combinations thereof.

11. The process of claim 9, further comprising forming a toner from the latex.

12. A process for preparation of latex comprising:
dissolving a polyester resin in an organic solvent to provide a solution, wherein the polyester resin comprises potassium ion, tin ion, or both;
removing an insoluble fraction of the at least one polyester resin, the insoluble fraction comprising 10%-50% of the potassium ion, tin ion, or both, wherein the insoluble fraction of the at least one polyester resin is formed after a delay period of about 2 hours to about 96 hours following the dissolving step and further wherein removing the insoluble fraction comprises filtration, decantation, centrifugation or combinations thereof after the delay period.

13. The process of claim 12, wherein the insoluble fraction comprises about 10%-35% of the potassium ion, tin ion, or both.

* * * * *